US008950641B2

(12) United States Patent
Matteson et al.

(10) Patent No.: US 8,950,641 B2
(45) Date of Patent: Feb. 10, 2015

(54) HAND TOOL HOLDER FOR MOUNTING ON SKID-LOADER OR OTHER POWER MACHINE

(71) Applicants: Dennis L. Matteson, Darlington, WI (US); Ryan A. Matteson, Mt. Horeb, WI (US)

(72) Inventors: Dennis L. Matteson, Darlington, WI (US); Ryan A. Matteson, Mt. Horeb, WI (US)

( * ) Notice: Subject to any disclaimer, the term of this patent is extended or adjusted under 35 U.S.C. 154(b) by 0 days.

(21) Appl. No.: 13/836,865

(22) Filed: Mar. 15, 2013

(65) Prior Publication Data

US 2013/0270314 A1    Oct. 17, 2013

Related U.S. Application Data

(63) Continuation-in-part of application No. 13/622,616, filed on Sep. 19, 2012.

(60) Provisional application No. 61/537,220, filed on Sep. 21, 2011.

(51) Int. Cl.
*B60R 11/06* (2006.01)

(52) U.S. Cl.
USPC .......................................... 224/401; 224/419

(58) Field of Classification Search
CPC ........ B60R 11/00; B60R 11/06; A47L 13/512
USPC ................................................ 224/401, 419
See application file for complete search history.

(56) References Cited

U.S. PATENT DOCUMENTS

```
   527,032  A  * 10/1894  Whiting ......................... 248/113
 2,983,413  A  *  5/1961  Verwers ......................... 224/318
 3,596,859  A  *  8/1971  MacDonald .................... 248/214
 3,897,895  A  *  8/1975  Read .............................. 224/323
 4,025,080  A  *  5/1977  Gedeon .......................... 280/834
 4,214,688  A  *  7/1980  Griffin, Jr. ..................... 224/197
 4,396,138  A  *  8/1983  Kirschner ...................... 224/318
 D271,160  S  * 11/1983  Sherwin ......................... D3/229
 D291,746  S  *  9/1987  Evans ............................ D3/228
 4,733,809  A  *  3/1988  Pursell .......................... 224/329
 4,830,247  A  *  5/1989  Banks ........................... 224/666
 4,889,377  A    12/1989  Hughes
 5,232,137  A  *  8/1993  Devine .......................... 224/666
 5,249,770  A  * 10/1993  Louthan ..................... 248/311.2
 5,263,837  A  * 11/1993  Dompe .......................... 224/190
 5,316,191  A     5/1994  Gibson et al.
 5,411,237  A  *  5/1995  Dougherty .................... 248/534
 5,573,162  A    11/1996  Spencer et al.
 5,957,352  A     9/1999  Gares
 6,431,373  B1 *  8/2002  Blick ........................... 211/70.6
 6,484,913  B1   11/2002  Hancock et al.
 6,557,739  B1 *  5/2003  Pursley et al. ................ 224/268
 7,281,701  B1   10/2007  Huang
```

(Continued)

*Primary Examiner* — Brian D Nash

(74) *Attorney, Agent, or Firm* — Patentability Associates

(57) ABSTRACT

A hand tool holder, for a skid-loader and the like, includes a clip formed of a sheet of resilient material, such as heat-treated steel, bent into a V-shape and having a rounded section near an open end for holding a handle of a hand tool. In one embodiment the hand tool holder is attached to an arm of a skid-loader by means of a strap and a ratchet mechanism. The strap is inserted through strap holes in the base and around the arm of the skid-loader and tightened with the ratchet mechanism such that the hand tool holder is held firmly against the skid-loader. Normally a second hand tool holder is mounted on the arm of the skid-loader in parallel with the first hand tool holder, with the respective clips being oriented such that a handle of a hand tool can be inserted into and securely held in both clips.

12 Claims, 2 Drawing Sheets

(56) References Cited

U.S. PATENT DOCUMENTS

| | | |
|---|---|---|
| 2005/0127122 A1 * | 6/2005 | McKenzie et al. ............ 224/547 |
| 2005/0230444 A1 | 10/2005 | Alling et al. |
| 2007/0039986 A1 | 2/2007 | Tomasi |
| 2013/0270314 A1 * | 10/2013 | Matteson et al. ............ 224/401 |

* cited by examiner

HAND TOOL HOLDER FOR MOUNTING ON SKID-LOADER OR OTHER POWER MACHINE

CROSS-REFERENCE TO RELATED APPLICATIONS

This application is a continuation-in-part of application Ser. No. 13/622,616, filed Sep. 19, 2012, which claimed the priority of Provisional Application No. 61/537,220, filed Sep. 21, 2011, each of which is incorporated herein by reference in its entirety.

FIELD OF THE INVENTION

This invention relates to skid-loaders, skid-steers and similar power machines and in particular to a device for mounting hand tools onto such machines.

BACKGROUND

A person who operates a skid-loader, skid-steer or similar power machine frequently needs to have one or more hand tools, such as a broom, rake, or shovel, available to finish the job that he or she is engaged in. Such power machines reduce dramatically the time it takes to perform a job, but they are not capable of performing the small "cleanup" tasks that are required to complete the job in a satisfactory manner.

There is no convenient way to carry such hand tools on the skid-loader or other machine. As a result, the operator must return to the location where the hand tools are stored. Depending on the location where the hand tools are stored, this can significantly increase the amount of time that it takes to complete the job.

Thus it would be highly desirable to have a technique for mounting a hand tool such as a broom onto the skid-loader. Various ways of doing this have been attempted, such as attaching a piece of pipe to the rear of the machine into which the handle of the tool is inserted, but none have been satisfactory.

SUMMARY

A hand tool holder according to this invention comprises a base and a clip. The clip comprises a sheet of resilient material, such as heat-treated steel, bent into a U-shape and having a rounded section near an open end for holding a handle of a hand tool. The clip is attached to the base, preferably by inserting its closed end into a hole that is machined into the base. In one embodiment the hand tool holder is attached to an arm of a skid-loader by means of a strap and a ratchet mechanism. The strap is inserted through strap holes in the base and around the arm of the skid-loader and tightened with the ratchet mechanism such that the hand tool holder is held firmly against the skid-loader.

Normally a second hand tool holder is mounted on the arm of the skid-loader in "parallel" with the first hand tool holder, with the respective clips being oriented such that a handle of a hand tool can be inserted into and securely held in both clips.

Thus the operator of the skid-loader can easily insert the handle of the hand tool into the clips while he or she is operating the skid-loader and remove the hand tool when necessary to perform "clean up" tasks.

BRIEF DESCRIPTION OF THE DRAWINGS

The invention will be better understood by referring to the following description and drawings, which are not necessarily drawn to scale.

DETAILED DESCRIPTION

As used herein, the term "skid-loader" includes skid-loaders, skid-steers and other similar power machines.

Figure 1:
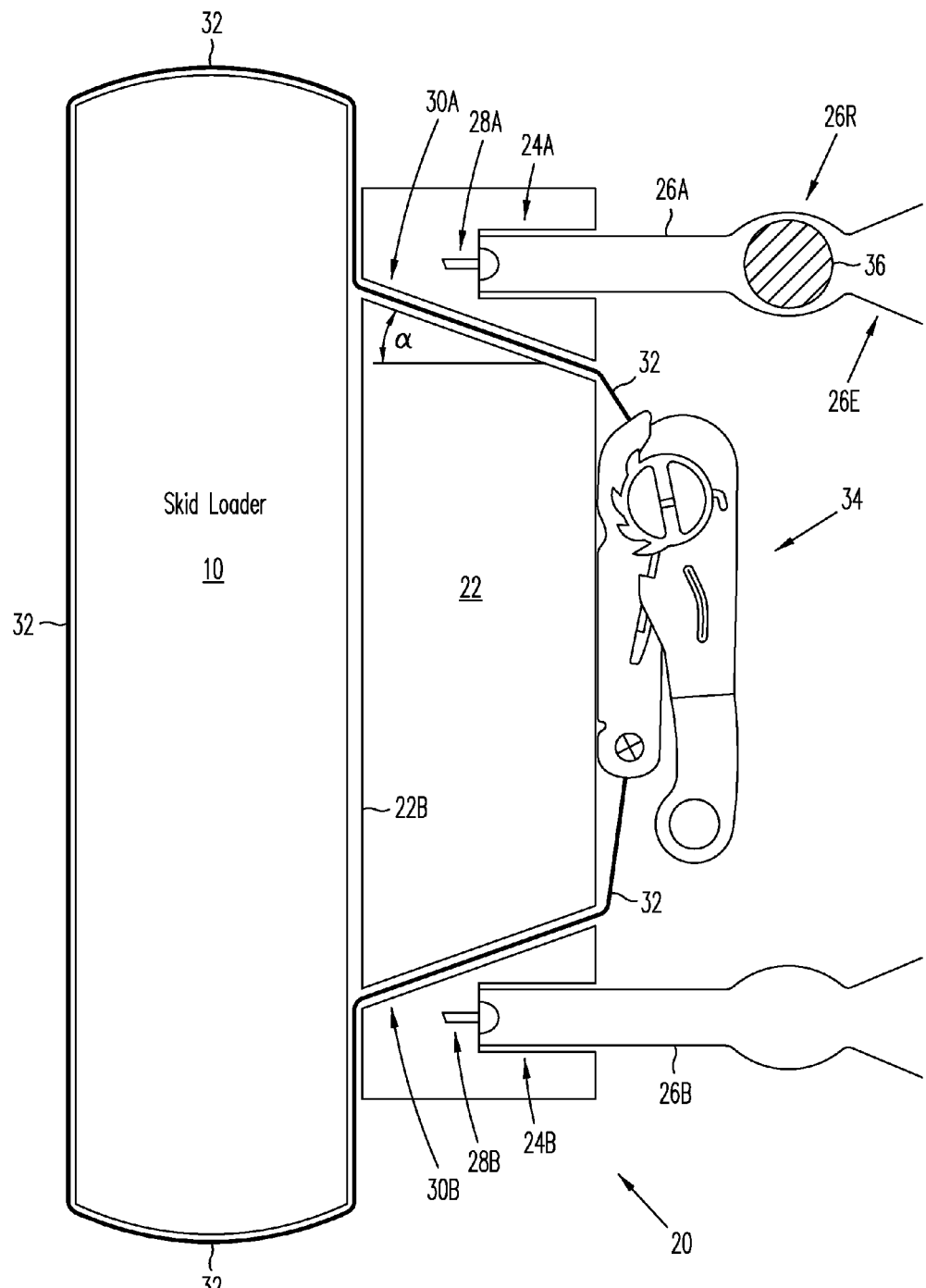
FIG. 1 is a cross-sectional view of a hand tool holder according to the invention.

FIG. 1 illustrates a cross-sectional view of an arm 10 of a skid-loader, and a hand tool holder 20 of this invention, showing how the hand tool holder 20 is mounted on the arm 10. Hand tool holder 20 comprises a base 22, which is a solid block of material. In one embodiment, base 22 may comprise a block of UHMW (ultra-high molecular weight) plastic with a length of 8 inches, a width of 3 inches and a thickness of 2 inches the thickness being the dimension perpendicular to arm 10 and the length being the vertical dimension in FIG. 1. Base 22 has a flat back surface 22B that is pressed firmly against a surface of the skid-loader arm 10 in the manner described below. In other embodiments, the back surface of the base may be shaped appropriately to fit against a contoured surface on the skid-loader.

Figure 2:
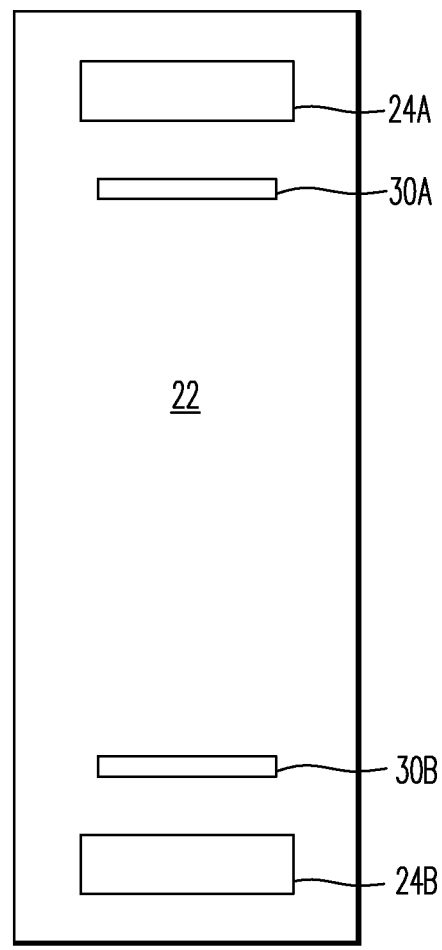
FIG. 2 is a view of the base of the handle tool holder.

FIG. 2 illustrates a view of the base 22 taken from the right side of FIG. 1.

Base 20 has elongated holes 24A and 24B machined into it for holding U-shaped clips 26A and 26B, respectively. Clips 26A and 26B may be made of 9 inch-long strips of a heat-treated metal or other resilient or spring-like material. As shown, clips 26A and 26B are formed into a U-shape, with closed ends of the clips 26A and 26B inserted into the holes 24A and 24B, respectively. In this embodiment, holes 24A and 24B are 1 inch deep and measure 1½ inches×⅝ inches in the view of FIG. 2. Holes 24A and 24B are located 1/2 inch from the top and bottom, respectively, of base 22. In all embodiments holes 24A and 24B should be deep enough to ensure that the clips 26A and 26B are firmly anchored in the base 22. Clips 26A and 26B are attached securely to base 22 by means of screws 28A and 28B that are inserted through holes in the bottoms of clips 26A and 26B and threaded into the base 22 at the bottoms of holes 24A and 24B.

At an open end of U-shaped clip 26A, clip 26A includes a rounded section 26R and an entry section 26E. In the rounded section 26R the upper and lower legs of the clip 26A are rounded so as to enclose and grip a handle 36 of a hand tool, such as a shovel or broom. In the entry section 26E the upper and lower legs of the clip 26A are flared outward so as to easily permit the handle 36 to be inserted into the rounded section 26R. In one embodiment the clip 26A is formed to an elliptical shape in the rounded section 26R. Thus the resilient characteristics of the clip 26A allow handle 36 to be easily inserted into and removed from the rounded section 26R. As shown, the rounded section 26E is located at a distance from the arm 10 to provide for a "standoff" for the hand tool when handle 36 is mounted in the tool holder 20.

Clip 26B includes rounded and entry sections similar to the rounded section 26R and entry section 26E of clip 26A for allowing a handle of a hand tool (not shown) to be inserted and removed from clip 26B.

In other embodiments, the hand tool holder may include only one clip, or it may include three or more clips.

As also shown in FIGS. 1 and 2, upper and lower strap holes 30A and 30B are machined all the way through base 22 at an angle α with respect to the horizontal top and bottom surfaces of block 22. In one embodiment the angle α is 20 degrees.

Hand tool holder 20 is secured to the arm 10 by means of a strap 32 and a ratchet mechanism 34. As shown in FIG. 1, the strap 32 is passed through the upper strap hole 30A, around the arm 10, and through the lower strap hole 30B. Strap 32 may be made of polypropylene or another UV (ultraviolet) resistant material. Strap 32 may be from 1 to 2 inches wide and 2 to 3 feet in length, for example. The ends of strap 32 are fixed in the ratchet mechanism 34, which is this embodiment rests against the right surface of the base 22. As a result, when the ratchet mechanism 34 is tightened, the base 22 is pressed firmly against the arm 10. In other embodiments, the ratchet mechanism may be positioned in a different location—for example, against the arm 10—when the hand tool holder is mounted to the arm of the skid-loader.

Ratchet mechanism 34 may measure 1½ inches×4 inches and may be of a kind that is widely available in hardware stores and the like, such as the fastener for straps described in U.S. Pat. No. 7,281,701 to Huang, which is incorporated herein by reference in its entirety.

It will be understood that another hand tool holder similar to hand tool holder 20 is typically attached to the arm 10 in "parallel" with the hand tool holder 20 so that handle 36 is gripped by another clip similar to clip 26A. In many cases, the two hand tool holders are mounted about 2 feet apart on the arm. The straps are tightened around the blocks and the arm of the skid loader by the ratchet mechanisms, which hold the blocks firmly. This in turn allows the bases with the embedded clips to protrude away from the body of the skid-loader or other machine on which they are mounted, and to then receive the handles of the tools to be carried.

There are numerous ways of manufacturing the hand tool holder 20. In one process, the base 22 is cut from a sheet of plastic to its dimensions of 8 inches×2 inches×3 inches. The sheet of plastic is then machined so that there are four holes in it to the proper dimensions. Each of the clips 26A, 26B is cut from a sheet of steel that is 0.050 inch thick to its dimensions of 1½ inches×9 inches, The sheet metal is formed with three bends made with two different dies. The first bend is to put an elliptical bend in first one end of the metal and then the other end in order to form the rounded section 26R. The die is then changed so that the metal sheet can be bent into a "U" shape with the two elliptical bends opposite each other. Holes for mounting the clips 26A, 26B are drilled in the base of the "U", and holes for retainer pins ma be drilled near the ends of the clips 26A, 26B for the purpose of further securing the tool handles. The metal clips 26A, 26B are then heat treated to turn them into spring steel and then coated with urethane or another coating for rust protection. Clips 26A, 26B are then mounted in the plastic base, and a screw is drilled through the clips 26A, 26B into the base 22 to retain the clips 26A, 26B in the base 22. The ratchet mechanism 34 and strap 32 are then affixed to the base 22.

The base of the hand tool holder may be formed in any dimensions or of any material that suits a user's needs. The clips also can be turned and mounted in a perpendicular direction to accommodate other applications, and can be any mounted in any number on a base. Also, the ratchet mechanism and strap may be omitted, and the bases of the hand tool holder may be mounted to the skid-loader or other machine with screws or bolts, or adhesives. The only requirement is that the skid-loader or other machine have surfaces which allow the rounded sections of the clips to line up properly so that a handle can be securely held in them when two hand tool holders are mounted to the machine.

To insert a hand tool into the holder, its handle is placed against either the entry section of a clip in each of two tool holders. The person then gives a firm shove, which locks the handle in place in the clips. Extraction of the tool is the opposite. The person would grab the shovel handle in the center between the tool holders and pull firmly. This removes the tool from the clips.

The clips can also be used for storage or temporary construction in the holding together of sheets of plywood, or drywall, etc.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

We claim:

1. A hand tool holder adapted for attachment to a skid-loader comprising:
   a base;
   a clip attached to the base, the clip comprising a sheet of resilient material formed into a U-shape and having a shaped section near an open end of the clip for holding a hand tool;
   a strap in contact with the base; and
   means for tightening the strap around an arm of the skid-loader so as to secure the hand tool holder to the arm of the skid-loader;
   wherein a hole is formed in the base for holding the clip, the hole having a bottom, the clip being inserted into the hole such that a closed end of clip is in contact with a bottom of the hole.

2. The hand tool holder of claim 1 wherein a second hole is formed in the closed end of the clip, a screw being inserted through the second hole and threaded into the base.

3. The hand tool holder of claim 1 wherein the base comprises a pair of strap holes, the strap being threaded through the strap holes.

4. The hand tool holder of claim 1 wherein the means for tightening comprises a ratchet mechanism, the strap being attached to the ratchet mechanism, the ratchet mechanism being operable so as to tighten the strap around the atm of the skid-loader.

5. A combination comprising a skid-loader and a hand tool holder, the hand tool holder comprising a base and a clip attached to the base, the clip comprising a sheet of a resilient material formed into a U-shape and having a shaped section near an open end of the clip for holding a hand tool, the hand tool holder being attached to an arm of the skid-loader by means of a strap, the strap being in contact with the base of the hand tool holder and wrapped around the arm of the skid-loader; and wherein a hole is formed in the base for holding the clip, the hole having a bottom, the clip being inserted into the hole such that a closed end of the clip is in contact with a bottom of the hole.

6. The combination of claim 5 wherein the clip projects outward from the base in a direction away from the arm of the skid-loader.

7. The combination of claim 5 wherein a second hole is formed in the closed end of the clip, a screw being inserted through the second hole and threaded into the base.

8. The combination of claim 5 comprising means for tightening the strap around the arm of the skid-loader.

9. The combination of claim 8 wherein the means for tightening comprises a ratchet mechanism, the strap being threaded through the ratchet mechanism.

10. The combination of claim 5 further comprising a hand tool, a handle of the hand tool being held in the shaped section of the clip.

11. The combination of claim 5 comprising a second tool holder attached to the arm of the skid-loader, the second tool holder comprising a second clip, the second clip comprising a second sheet of resilient material formed into a U-shape and having a second shaped section near an open end of the second clip for holding a handle of the hand tool, the second clip being oriented to the clip such that the handle of the hand tool can be inserted into the respective shaped sections of the clip and the second clip.

12. The combination of claim 11 further comprising a hand tool, a handle of the hand tool being held in the shaped sections of the clip and the second clip.

\* \* \* \* \*